United States Patent [19]
Holliday

[11] Patent Number: 5,582,102
[45] Date of Patent: Dec. 10, 1996

[54] EMBOSSING BLOCK REGISTRATION SYSTEM

[75] Inventor: B. Kenneth Holliday, Conyers, Ga.

[73] Assignee: Southeastern Die Company, Inc., Decatur, Ga.

[21] Appl. No.: 550,377

[22] Filed: Oct. 30, 1995

[51] Int. Cl.$^6$ ..................................................... B31F 1/07
[52] U.S. Cl. ............................................. 101/28; 101/389
[58] Field of Search .................................. 101/27, 28, 32, 101/41, 9, 16, DIG. 36, 368, 382.1, 383, 384, 389, 390, 393, 481

[56] References Cited

U.S. PATENT DOCUMENTS

| | | | |
|---|---|---|---|
| 994,686 | 6/1911 | Mitchell | 101/27 |
| 1,417,749 | 5/1922 | Koppe | 101/382.1 |
| 1,633,810 | 6/1927 | Fellows | 101/382.1 |
| 1,708,687 | 4/1929 | Bartel | 101/383 |
| 1,839,370 | 1/1932 | Borton | 72/482.4 |
| 1,866,379 | 7/1932 | Vandercook et al. | 101/383 |
| 2,252,484 | 8/1941 | Greenleaf et al. | 101/28 |
| 3,085,508 | 4/1963 | Hurwitz | 101/28 |
| 4,537,124 | 8/1985 | Graboyes | 101/28 |
| 4,598,574 | 7/1986 | Hegel et al. | 72/462 |
| 4,850,950 | 7/1989 | Holliday | 101/163 |
| 5,095,830 | 3/1992 | Love | 101/28 |
| 5,136,936 | 8/1992 | Holliday | 101/28 |
| 5,181,304 | 1/1993 | Piotrowski | 29/271 |
| 5,197,367 | 3/1993 | Holliday | 403/409.1 |

Primary Examiner—Eugene H. Eickholt
Attorney, Agent, or Firm—Watson Cole Stevens Davis, P.L.L.C.

[57] ABSTRACT

An embossing block registration system includes a base plate adapted to be mounted in a fixed position within a die chase, an adjustable plate supported on the base plate and adjustable with respect thereto, and an embossing block supported on the adjustable plate and adjustable with respect to the adjustable plate. Securing screws are provided to secure the adjustable plate in an adjusted position relative to the base plate. Fixing screws are provided to fix the embossing block in an adjusted position relative to the adjustable plate. Two adjustment carriages mounted on the base plate are actuated by rotation of associated lead screws and snugly fit within recesses formed in the adjustable plate. Turning each lead screw adjusts the position of the corresponding adjustment carriage to effect movement of the adjustable plate relative to the base plate. The embossing block pivots on the adjustable plate so that a skewing adjustment of the embossing block is also provided.

10 Claims, 2 Drawing Sheets

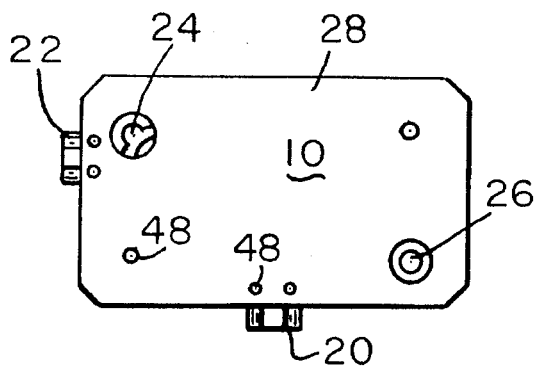
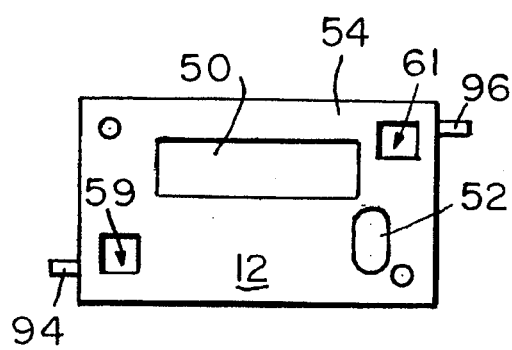
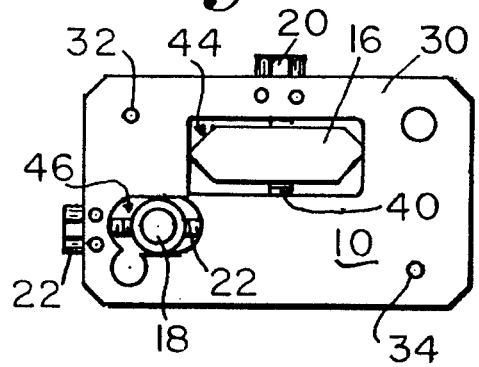
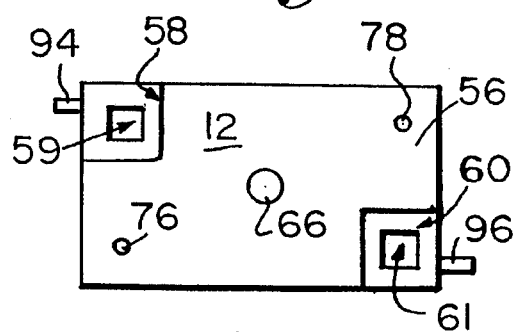
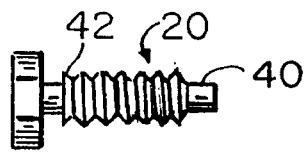
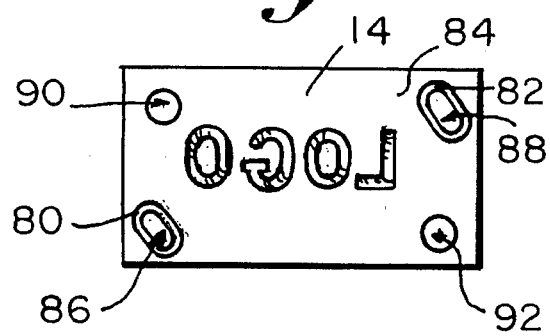
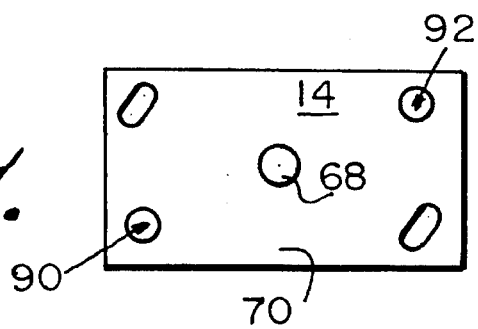

EMBOSSING BLOCK REGISTRATION SYSTEM

FIELD OF THE INVENTION

The present invention relates to a registration system for an embossing block or plate. More particularly, the present invention relates to an embossing block registration system which includes a base plate, an adjustable plate mounted on the base plate and adjustable relative thereto, and an embossing block mounted on the adjustable plate for pivoting movement relative to the adjustable plate.

BACKGROUND OF THE INVENTION

Currently available embossing block registration systems require adjustment of numerous adjustment means to achieve a desired position of the embosser. According to some methods, an embossing is cemented to a steel rule die after many trial and error attempts to register the embosser with print. Cam systems have also been used to shift an inserted embossing block in order to obtain print registration. These systems suffer, however, in that they are difficult to operate and require considerable time to set up and substantial expense.

U.S. Pat. No. 4,577,124 discloses an embosser mounting insert registering means wherein set screws contact an embosser insert such that a longitudinal movement of the screws laterally move the insert to adjust registration of the embosser. Once the set screw is rotated so that proper registration is achieved, locking screws are used to lock the set screws in their positions. After repeated use, however, the set screws may need readjusting, which becomes difficult once the locking screws are in place. A great deal of time is necessary to remove the locking screws, readjust the set screws, and replace the locking screws. Also, problems arise with this device since the force of the set screws pushes directly against the steel rule die when they are tightened.

U.S. Pat. No. 5,136,936 discloses an embossing registration system which requires tightening and loosening four adjustment screws but only allows adjustment in two linear directions. The patent also discloses a system having more variable adjustments, but the embodiment requires adjustment of eight screws. Both alternatives of the system require a trial and error approach and considerable time to adjust.

Accordingly, a need exists for an embossing registration system which provides a very precise adjustment of an embossing block in a fast and easy procedure.

SUMMARY OF THE INVENTION

The present invention overcomes the shortcomings of the prior art and provides an embossing block registration system which is easy to operate and requires little downtime for adjustment. The system includes a base plate adapted to be mounted in a fixed position within a die chase, an adjustable plate supported by the base plate and adjustable with respect to the base plate, and an embossing block supported by the adjustable plate and adjustable with respect to the intermediate adjustable plate. Securing screws are provided to secure the adjustable plate in an adjusted position relative to the base plate. Fixing screws are provided to fix the embossing block in an adjusted position relative to the adjustable plate. Two adjustment carriages mounted on and projecting from the base plate are actuated by rotation of associated lead screws and are snugly fit within recesses formed in the adjustable plate. Turning each lead screw adjusts the position of the corresponding adjustment carriage to effect movement of the adjustable plate relative to the base plate. The embossing block pivots on the adjustable plate so that a skewing adjustment of the embossing block is also provided.

According to the present invention, fine adjustments in both the "X" and "Y" directions are each enabled by actuation of a single lead screw. Accordingly, very little time is required to adjust the position of the embossing block within the die chase. Due to the snug fitting of adjustment carriages within their respective housings in the base plate, the carriages are maintained in adjusted position and do not deviate from such positions upon tightening the securing screws. The embossing plate can be readily adjusted in a skewed position by simply loosening the fixing screws and manually pivoting the embossing block about the pivot member in the adjustable plate. Due to the snug tolerance between the pivot member and its corresponding recess in the embossing block, the embossing block remains in an adjusted skewed position while the fixing screws are tightened.

The system of the present invention provides fine adjustments of the embossing block using fewer steps and less time than required for adjustment of the prior art systems.

BRIEF DESCRIPTION OF THE DRAWINGS

The invention may be more fully understood with reference to the accompanying drawings, wherein:

FIG. 2 is a top plan view of a base plate of the registration system shown in FIG. 1 and including two adjustment means;

FIG. 3 is a bottom plan view of the base plate shown in FIG. 2;

FIG. 4 is a top plan view of the adjustable plate of the embossing registration system shown in FIG. 1;

FIG. 5 is a bottom plan view of the adjustable plate shown in FIG. 4;

FIG. 6 is a top plan view of the embossing block of the registration system shown in FIG. 1;

FIG. 7 is a bottom plan view of the embossing block shown in FIG. 6;

FIG. 8 is a perspective view of the embossing block registration system of FIG. 1 in an assembled state.

DETAILED DESCRIPTION OF THE INVENTION

Figure 1:
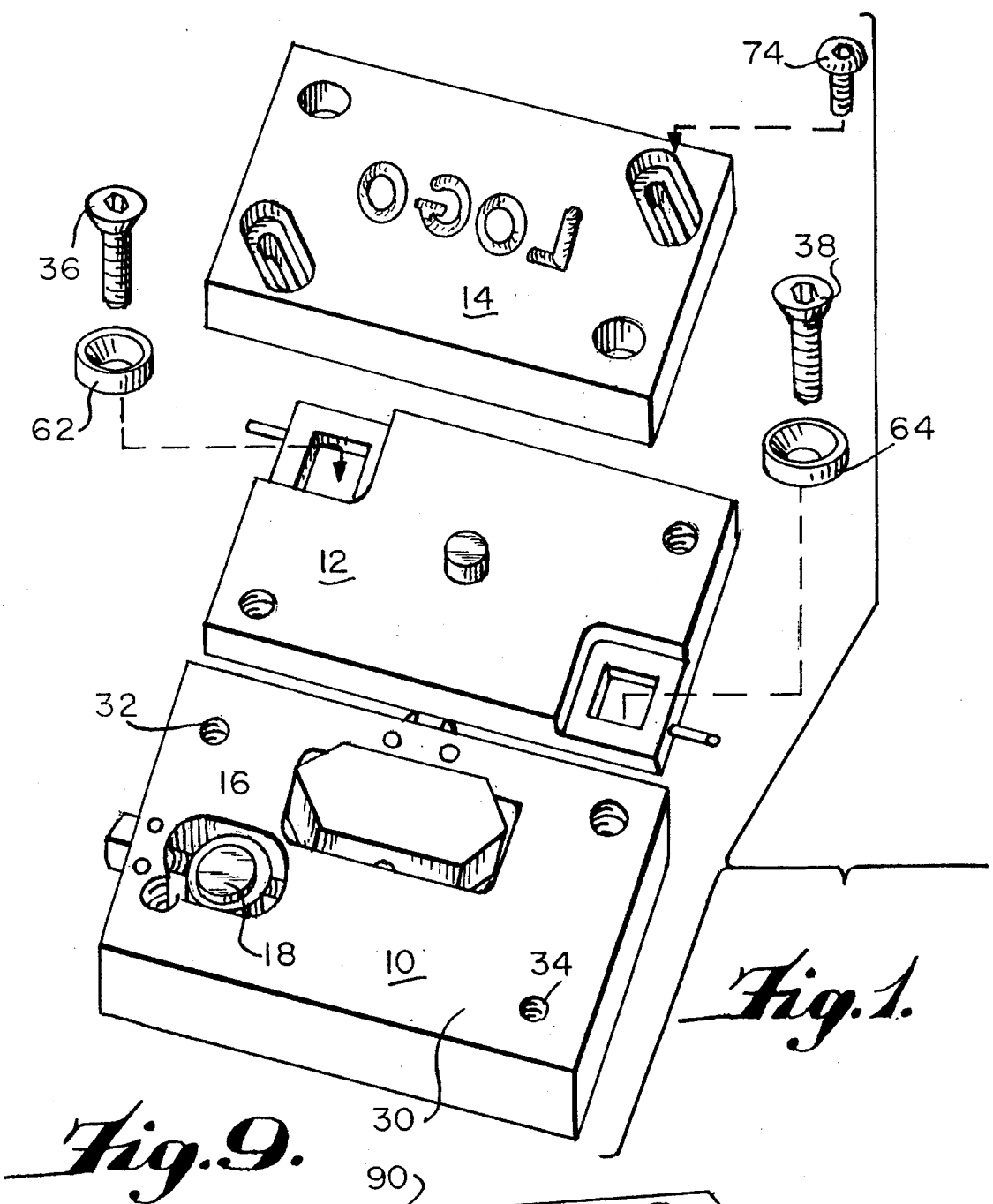
FIG. 1 is an exploded perspective view of an embossing block registration system according to the present invention.

FIGS. 1–9 show an exemplary embodiment of the embossing block registration system of the present invention. The embossing block registration system comprises a base plate 10, an adjustable plate 12, and an embossing block 14. Adjustment means, shown as adjustment carriages 16 and 18, are mounted upon the base plate 10 for movement relative thereto. Adjustment carriages 16 and 18 are oriented for movement at an angle to one another. In the embodiment shown, the carriages are arranged for movement in directions perpendicular to each other.

Movement of the adjustment carriages 16 and 18 is controlled by rotation of threaded adjustment screws 20 and 22, respectively. Threaded adjustment screws 20 and 22 engage threaded openings formed through the adjustment carriages 16 and 18, respectively. In the embodiment shown, clockwise rotation of the threaded adjustment screws 20 and 22 causes movement of the adjustment carriages in directions away from the respective heads of the adjustment screws. Counterclockwise rotation of the adjustment screws causes movement of the adjustment carriages towards the screw heads of the respective adjustment screws.

As best seen in FIG. 3, the base plate 10 is provided with threaded openings 24 and 26 to secure the base plate 10, and thus the registration system, within the die chase of an embossing press. Screw holes 24 and 26 may extend completely through the base plate 10 but need only be as deep as necessary to receive mounting screws used to hold the base plate in a die chase (not shown). Screw holes 24 and 26 are formed in the bottom surface 28 of the base plate 10, opposite the top surface 30 of the base plate from which adjustment carriages 16 and 18 protrude. Top surface 30 of the base plate 10 is provided with two screw holes 32 and 34 for receiving securing screws 36 and 38, respectively.

Figure 9:
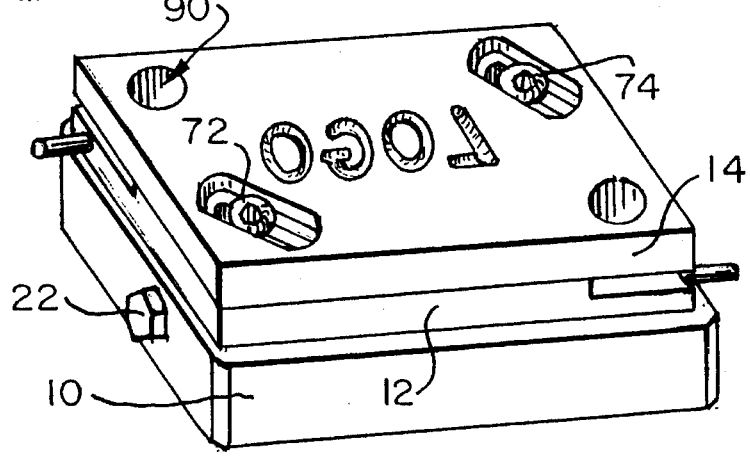
FIG. 9 is an enlarged plan view of a threaded adjustment screw used in the base plate of the present invention.

As best seen in FIGS. 2 and 9, adjustment screws 20 and 22 (screw 20 shown in FIG. 9) are provided with a non-threaded screw end 40 and a smooth shoulder 42. The non-threaded screw end 40 seats in a non-threaded recess disposed in a side wall of housing recess 44. Housing recess 44 is provided in the base plate to house adjustment carriage 16. Similarly, threaded adjustment screw 22 is provided with a non-threaded screw end and is seated in a recess within the side wall of housing recess 46 for adjustment carriage 18. In manufacturing the base plate, the adjustment screws are passed through non-threaded side openings in the base plate, then threaded through the threaded openings in the respective adjustment carriages, and seated in the side wall recesses for the screw ends. To permanently secure the adjustment screws in place, so that they will not be forced out of position in the base plate, permanent anchoring pins 48 (FIGS. 2 and 3) are inserted through the top or bottom surface of the base plate. The anchoring pins rest against the smooth shoulder of each adjustment screw to hold each screw permanently in place.

As best seen in FIG. 1, adjustment carriages 16 and 18 project beyond the top surface 30 of the base plate. A major portion of each adjustment carriage, however, is housed within the respective recesses 44 and 46 formed in the base plate.

The portions of the carriages 16 and 18 which project from the top surface 30 of base plate 10 engage recesses 50 and 52 formed in the bottom surface 54 of adjustable plate 12. The projecting portions of the carriages fit snugly within the respective recesses 50 and 52, along the dimension corresponding to the direction of travel of the adjustment members. The recesses 50 and 52 are provided with much larger dimensions in the directions parallel to movement of each opposite adjustment carriage. By providing such an arrangement, adjustment of carriage 16 will provide movement of adjustable plate 12 in an "X" direction without causing any movement of the adjustable plate in a perpendicular "Y" direction. Likewise, adjustment of carriage 18 provides movement of adjustable plate 12 in a "Y" direction without affecting movement of the adjustable plate in the "X" direction.

By adjusting the screws 20 and 22, and thus adjusting carriages 16 and 18, respectively, precise positioning of adjustable plate 12 relative to base plate 10 can be accurately controlled in both the "X" and "Y" directions. Once the adjustable plate 12 is adjusted to a desired position relative to base plate 10, the adjustable plate is secured to the base plate by securing screws 36 and 38.

As best seen in FIGS. 1 and 4, the top surface 56 of adjustable plate 12 is provided with recesses 58 and 60. Recesses 58 and 60 are provided so that the heads of securing screws 36 and 38, and their respective corresponding washers 62 and 64, do not project above the top surface 56 of the adjustable plate. The recesses 58 and 60 ensure that the securing screws and their respective washers do not interfere with pivoting motion of the embossing block 14 on the adjustable plate. Recesses 58 and 60 are respectively provided with openings 59 and 61 therethrough. Openings 59 and 61 are sufficiently large enough to allow adequate movement of adjustable plate 12 relative to base plate 10 and yet provide access to screw holes 32 and 34 in any adjusted position of the adjustable plate. Likewise, recesses 58 and 60 are sufficiently large enough to allow movement of adjustable plate 12 in any of the possible adjusted positions. Washers 62 and 64 are large enough to prevent securing screws 36 and 38 from passing through openings 59 and 61, respectively. Washers 62 and 64 have diameters which exceed the dimensions of openings 59 and 61 such that washers 62 and 64 are also prevented from passing through openings 59 and 61.

As shown in FIGS. 1 and 4, the top surface 56 of adjustable plate 12 is provided with a pivot member 66 projecting therefrom. The pivot member 66 is snugly received within a recess 68 disposed in the bottom surface 70 of embossing block 14 (FIG. 7). The pivot member and associated recess enable the embossing block to pivot relative to the adjustable plate to thus provide a skewing adjustment of embossing block 14.

After adjusting the embossing block to a desired skewed position relative to the adjustable plate, the embossing block is fixed to the adjustable plate by tightening fixing screws 72 and 74 (FIGS. 1 and 8). Fixing screws 72 and 74 are received within threaded holes 76 and 78, respectively, formed in the top surface 56 of adjustable plate 12. As seen in FIG. 6, the screw heads of fixing screws 72 and 74 are received within recesses 80 and 82, respectively, formed in the top surface 84 of embossing block 14. Through-openings 86 and 88 are provided in the recesses 80 and 82, respectively. The through-openings are large enough to allow pivoting movement of embossing block 14 on adjustable plate 12 while fixing screws 72 and 74 are loosely held within screw holes 76 and 78 in the adjustable plate. Preferably, through-openings 86 and 88 are shaped as arcs to allow pivoting movement of embossing block 14 with respect to adjustable plate 12. The arc-shaped openings are formed along an arc defined by the radius between the pivot member 66 and the through-openings.

As seen in FIGS. 1 and 6–8, embossing block 14 is also provided with through-holes 90 and 92 which allow access to securing screws 36 and 38 used for securing adjustable plate 12 to base plate 10. Through-holes 90 and 92 are large enough to gain access to securing screws 36 and 38 in any of the adjusted skewed positions of embossing block 14.

Adjustable plate 12 may further be provided with holding pins 94 and 96 which prevent the adjustable plate from falling out of a die chase in an embossing press. Typically, holding pins 94 and 96 are used to temporarily hold the entire embossing block registration system within a die chase until the base plate can be mounted to the embossing press.

Although the present invention has been described in connection with preferred embodiments, it will be appreciated by those skilled in the art that additions, modifications, substitutions and deletions not specifically described may be made without departing from the spirit and scope of the invention defined in the appended claims.

What is claimed is:

1. An embossing registration system comprising a base plate adapted to be mounted in fixed position within a die chase, an adjustable plate supported by said base plate, adjustment means for adjusting the position of said adjustable plate relative to said base plate, securing means for securing said adjustable plate in adjusted position relative to said base plate, an embossing block supported by said adjustable plate, the position of said embossing block being adjustable relative to said adjustable plate, and fixing means for fixing said embossing block in adjusted position relative to said adjustable plate, wherein said adjustment means is mounted upon said base plate for movement relative thereto, said adjustment means engaging said adjustable plate, and wherein said adjustment means includes a first adjustment member and a second adjustment member, said first adjustment member being moveable in a first direction relative to said base plate, said second adjustment member being moveable in a second direction relative to said base plate, said directions being oriented at an angle to one another, said base plate having a surface and said adjustable plate having a first surface for engaging said base plate surface, said first and second adjustment members projecting beyond said base plate surface, said first surface of the adjustable plate having first and second recesses formed therein for receiving said first and second adjustment members respectively.

2. An embossing registration system as defined in claim 1, wherein said base plate surface has a pair of holes formed therein, a major portion of each of said adjustment members being disposed within one of said holes.

3. An embossing registration system as defined in claim 1, wherein said first recess has a dimension in said first direction for snugly receiving said first adjustment member therein, said first recess having a dimension in said second direction greater than said dimension in said first direction and greater than a corresponding dimension of said first adjustment member in said second direction.

4. An embossing registration system as defined in claim 1, wherein said first and second adjustment members each have a dimension in said first direction and a dimension in said second direction, said first recess having a dimension in said first direction which is substantially the same as the dimension of said first adjustment member in said first direction, said first recess having a dimension in said second direction which is greater than the dimension of said first adjustment member in said second direction, said second recess having a dimension in said second direction which is substantially the same as the dimension of said second adjustment member in said second direction, said second recess having a dimension in said first direction which is greater than the dimension of said second adjustment member in said first direction.

5. An embossing registration system as defined in claim 1, wherein each of said adjustment members has a threaded opening formed therethrough, said base plate having a pair of openings formed therein and each aligned with the threaded opening in one of said adjustment members, a pair of adjustment screws, each adjustment screw extending through one of said openings in said base plate and being threaded into one of said threaded holes in one of said adjustment members.

6. An embossing registration system as defined in claim 1, wherein said first direction and said second direction are perpendicular to each other.

7. An embossing registration system comprising a base plate adapted to be mounted in fixed position within a die chase, an adjustable plate supported by said base plate, adjustment means for adjusting the position of said adjustable plate relative to said base plate, securing means for securing said adjustable plate in adjusted position relative to said base plate, an embossing block supported by said adjustable plate, the position of said embossing block being adjustable relative to said adjustable plate, and fixing means for fixing said embossing block in adjusted position relative to said adjustable plate, wherein said securing means includes a plurality of threaded holes formed in said base plate and a plurality of holes formed through said adjustable plate, said holes in said adjustable plate having a dimension in said first and second directions greater than the holes in said base plate, said securing means also including a plurality of threaded securing screws each of which passes through one of said holes in said adjustable plate and is threaded into one of the threaded holes in said base plate.

8. An embossing registration system comprising a base plate adapted to be mounted in fixed position within a die chase, an adjustable plate supported by said base plate, adjustment means for adjusting the position of said adjustable plate relative to said base plate, securing means for securing said adjustable plate in adjusted position relative to said base plate, an embossing block supported by said adjustable plate, the position of said embossing block being adjustable relative to said adjustable plate, and fixing means for fixing said embossing block in adjusted position relative to said adjustable plate, wherein said embossing block is supported by said adjustable plate for pivoting movement about an axis with respect to said adjustable plate.

9. An embossing registration system as defined in claim 8, wherein a pivot member is supported by and extends from said adjustable plate, said embossing block having a recess formed therein for receiving said pivot member.

10. An embossing registration system comprising a base plate adapted to be mounted in fixed position within a die chase, an adjustable plate supported by said base plate, adjustment means for adjusting the position of said adjustable plate relative to said base plate, securing means for securing said adjustable plate in adjusted position relative to said base plate, an embossing block supported by said adjustable plate, the position of said embossing block being adjustable relative to said adjustable plate, and fixing means for fixing said embossing block in adjusted position relative to said adjustable plate, wherein said fixing means includes a plurality of threaded holes formed in said adjustable plate and a plurality of holes formed through said embossing block, said holes in said embossing block having a dimension greater than the holes in said adjustable plate, said fixing means also including plurality of threaded fixing screws each of which passes through one of said holes in said embossing block and is threaded into one of the threaded holes in said adjustable plate.

\* \* \* \* \*